United States Patent
Javier

(10) Patent No.: US 10,407,881 B1
(45) Date of Patent: Sep. 10, 2019

(54) WATER DIVERTER AND RECYCLER

(71) Applicant: Elarde C. Javier, Waipahu, HI (US)

(72) Inventor: Elarde C. Javier, Waipahu, HI (US)

( * ) Notice: Subject to any disclaimer, the term of this patent is extended or adjusted under 35 U.S.C. 154(b) by 260 days.

(21) Appl. No.: 15/006,793

(22) Filed: Jan. 26, 2016

Related U.S. Application Data

(60) Provisional application No. 62/107,775, filed on Jan. 26, 2015.

(51) Int. Cl.
*E03B 1/04* (2006.01)
*F24D 17/00* (2006.01)

(52) U.S. Cl.
CPC .......... *E03B 1/048* (2013.01); *F24D 17/0078* (2013.01); *F24D 17/0094* (2013.01)

(58) Field of Classification Search
CPC ... E03B 1/048; F24D 17/0078; F24D 17/0094
USPC ....................................................... 122/14.3
See application file for complete search history.

(56) References Cited

U.S. PATENT DOCUMENTS

| | | | |
|---|---|---|---|
| 4,160,461 A | | 7/1979 | Vataru et al. |
| 5,564,462 A | * | 10/1996 | Storch ................ F24D 17/0078 122/13.3 |
| 5,794,643 A | | 8/1998 | Brice |
| 5,829,467 A | * | 11/1998 | Spicher ............... F24D 17/0078 137/14 |
| 6,588,377 B1 | | 7/2003 | Leary et al. |
| 7,731,097 B2 | | 6/2010 | Honeychurch et al. |
| 8,517,056 B2 | | 8/2013 | Cullin |
| 2009/0211644 A1 | * | 8/2009 | Wylie ................ F24D 17/0078 137/2 |
| 2011/0139269 A1 | | 6/2011 | Rogers |
| 2014/0261763 A1 | * | 9/2014 | Beckman ............ F24D 17/0078 137/337 |

FOREIGN PATENT DOCUMENTS

WO    2013017938 A1    2/2013

OTHER PUBLICATIONS

Instant Hot Water. Product Listing [online]. Taco Comfort Solutions, 2014 [retrieved on Aug. 26. 2014]. Retrieved from the Internet: http://taco-hvac.com/products/systems/instant_hot_water/index.html.
Watts 500800 Hot Water Recirculating System with Built-In Timer. Product Listing [online]. Watts, 2007 [retrieved on Aug. 26, 2014]. Retrieved from the Internet: http://www.amazon.com/Watts-500800-Premier-Water-Recirculation/dp/B000E78XHG.

* cited by examiner

*Primary Examiner* — Steven B McAllister
*Assistant Examiner* — John E Bargero
(74) *Attorney, Agent, or Firm* — Cramer Patent & Design, PLLC; Aaron R. Cramer

(57) ABSTRACT

A water system and a method of its operation that eliminates water waste between the time hot water is demanded and hot water at the proper temperature is applied to a fixture. This water system uses a water drainage system that diverts water from the line feeding the fixture into a storage tank and then returns that drained water back into a water heater for re-heating. Pumps can be used to assist both drainage and returning the drained water. Once the hot water line is cleared of tepid or cold water the water system supplies hot water from the water heater to the fixture. A vacuum valve opens to enable draining of the water line.

5 Claims, 4 Drawing Sheets

WATER DIVERTER AND RECYCLER

RELATED APPLICATIONS

This application claims the benefit of U.S. Provisional Application No. 62/107,775, which was filed Jan. 26, 2015, the entire disclosures of which are incorporated herein by reference.

FIELD OF THE INVENTION

The presently disclosed subject matter is directed to water distribution systems. More particularly it is directed to water distribution systems that drain water from the hot water piping that runs to a fixture, fills the drained piping with hot water for the fixture, and returns the drained water back to a water heater.

BACKGROUND OF THE INVENTION

Water supply systems have long been used in homes and buildings. A water supply system uses piping to supply fixtures such as tubs, sinks, and shower, with clean, potable hot and cold water. To do so water supply systems use pipes, water heaters, valves, outlets, storage tanks, possibly one or more pumps and other devices such as splitters to distribute water from a water inlet to the various fixtures. A well designed water supply system can reliably supply clean water to users at designed rates and temperatures.

While modern water supply systems have proven themselves to be highly valuable, and while they are very often required in homes and other buildings, water supply systems are not without problems. For example, some parts of the United States and many parts of the world face water shortages so water cannot be wasted. In addition, energy, water heating costs can be of major concerns in some locations and applications. These are problems because to obtain hot water from a fixture can require running cold or tepid water from the hot water fixture until the water line is cleared of cooler water and the hot water line fills with hot water.

The cold or tepid water usually just goes down a drain. While a minor problem if the hot water fixture is near the water heater, if the fixture is a distance away significant amounts of water can be wasted. Not only is the running water lost its residual heat is also lost. So a hot water fixture fifty feet (50 ft.) away from a hot water heater may cause the loss of a significant amount of water and residual heat until hot water arrives at a suitable temperature.

The foregoing problems may be intolerable, particularly as water shortages continue to worsen. Therefore, a need exists for advanced water supply systems that drain water from a hot water fixture into a water recovery storage tank before water comes from the hot water fixture, that then re-fills the hot water line with hot water to supply the hot water fixture with water at the proper temperature, and then returns the drained water to a hot water heater.

SUMMARY OF THE INVENTION

The principles of the present invention provide for an improved water supply system that saves otherwise wasted water and energy. The improved water supply system diverts water from a hot water fixture into a water recovery storage tank before hot water is supplied to the fixture, that then re-fills the hot water line with hot water to supply the hot water fixture with hot water at the proper temperature, and then returns the diverted water back into a hot water tank.

A water supply system in accord with the present invention includes a destination line for supplying water to a fixture, an electronically controlled vacuum valve connected to a fixture end of the destination line, the vacuum valve having an air inlet that selectively allows air to enter the destination line, and an electronically controlled hot water valve having a hot water input port, a drain port, and a hot water output port connected to the destination line. The hot water valve selectively enables water to drain from the hot water output port and out the hot water drain port. Also included is a storage tank having a storage tank input and a storage tank output. A drain connection is disposed between the storage tank input and the hot water drain port. A controller operatively connected to the vacuum valve and to the hot water valve selectively opens the air inlet while enabling water to drain from the destination line into the storage.

In practice such a drain connection may include a drain pump operatively controlled by the controller for assisting draining. The controller may include a microcontroller that operates in accord with a software program. Beneficially, the water heater has a water heater outlet port while a hot water outlet pipe connects the water heater outlet port to the hot water input port. If so, the controller can control the hot water valve to prevent hot water from flowing through the hot water outlet pipe when water drains into the storage tank.

The controller can control the hot water valve to enable water to flow through the hot water outlet pipe and into the destination line when water is not draining into the storage tank. The water heater beneficially includes a water heater inlet port while and the water system may further include an electronically controlled water tank inlet valve that is operatively connected to the controller. The water tank inlet valve then has a water inlet port, a water outlet port, and a storage tank inlet port. Also included is a water heater inlet pipe for transferring water from the water outlet port into the water heater. Furthermore, there may be a storage tank connection connecting the storage tank outlet port to the water inlet port. In that case the controller selectively causes the water tank inlet valve to enable water to flow from the storage tank connection into the water heater. The storage tank connection may include a connection pump operatively connected to the controller and in which the controller controls the connection pump to selectively pump water from the storage tank into the water heater.

The water supply system may further include a water inlet pipe connected to the water inlet port. If so the controller may control the water tank inlet valve to enable water to flow from the water inlet port into the water heater when water is not flowing from the storage tank connection into the water heater inlet pipe. The water supply system may further include a fixture connected to the vacuum valve. There may be a power input line and a relay controlled by the controller for selectively switching power to the drain pumps and or to the connection pump. Sensors may apply sensor control signals to the controller to inform the controller that was has stopped draining or that the storage tank is empty.

The operation of a water supply system in accord with the present invention includes heating water for a fixture, draining water from the system before applying hot water to the fixture, collecting the water drained from the system, returning collected water for heating; and sending hot water to the fixture. The operation may further include blocking water from flowing to a fixture while water is draining and blocking water from flowing into a water heater as water is draining. The step of draining may include pumping water away from a fixture. The step of returning collected water may include pumping collected water toward a water heater. The operation may further include sending water towards a fixture when water is not being drained. Input water might be received and heated and then sent to towards the fixture when water is not being drained or collected.

BRIEF DESCRIPTION OF THE DRAWINGS

The advantages and features of the present invention will become better understood with reference to the following more detailed description and claims taken in conjunction with the accompanying drawings in which like elements are identified with like symbols and in which:

DESCRIPTIVE KEY

Figure 1:
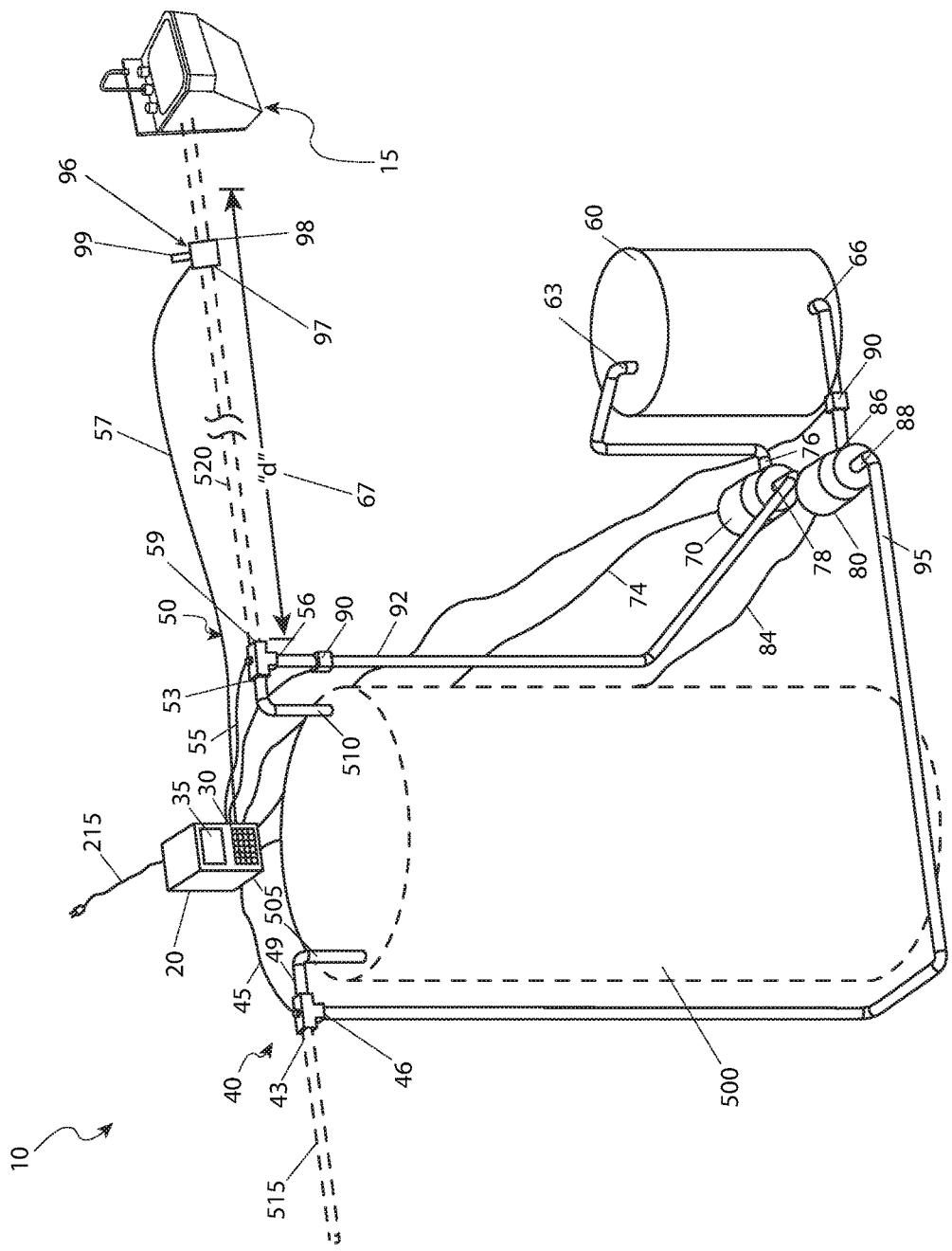
FIG. 1 is an isometric representation of a water system 10 that is in accord with the preferred embodiment of the present invention.

10 water system
15 plumbing fixture
20 control module
25 microprocessor
30 keypad
35 display screen
38 relay switch
40 first diverter valve
43 first valve first port
45 first valve signal wire
46 first valve second port
49 first valve third port
50 second diverter valve
53 second valve first port
55 second valve signal wire
56 second valve second port
57 third valve signal wire
59 second valve third port
60 storage tank
63 storage tank inlet
66 storage tank outlet
67 distance "d"
68 air
70 first pump
74 first power supply line
76 first pump inlet
78 first pump outlet
80 second pump
84 second pump power supply line
86 second pump inlet
88 second pump outlet
90 flow sensor
92 return pipe
95 recycle pipe
96 vacuum breaker valve
97 vacuum valve input
98 vacuum valve output
99 vacuum valve air relief port
100 normal phase
200 evacuation phase
213 AC relay contacts
215 AC power line
300 recycle phase
500 water heater
505 water heater inlet pipe
510 water heater outlet pipe
515 inlet pipe
520 destination pipe

DETAILED DESCRIPTION OF THE PREFERRED EMBODIMENT

Figure 2A:
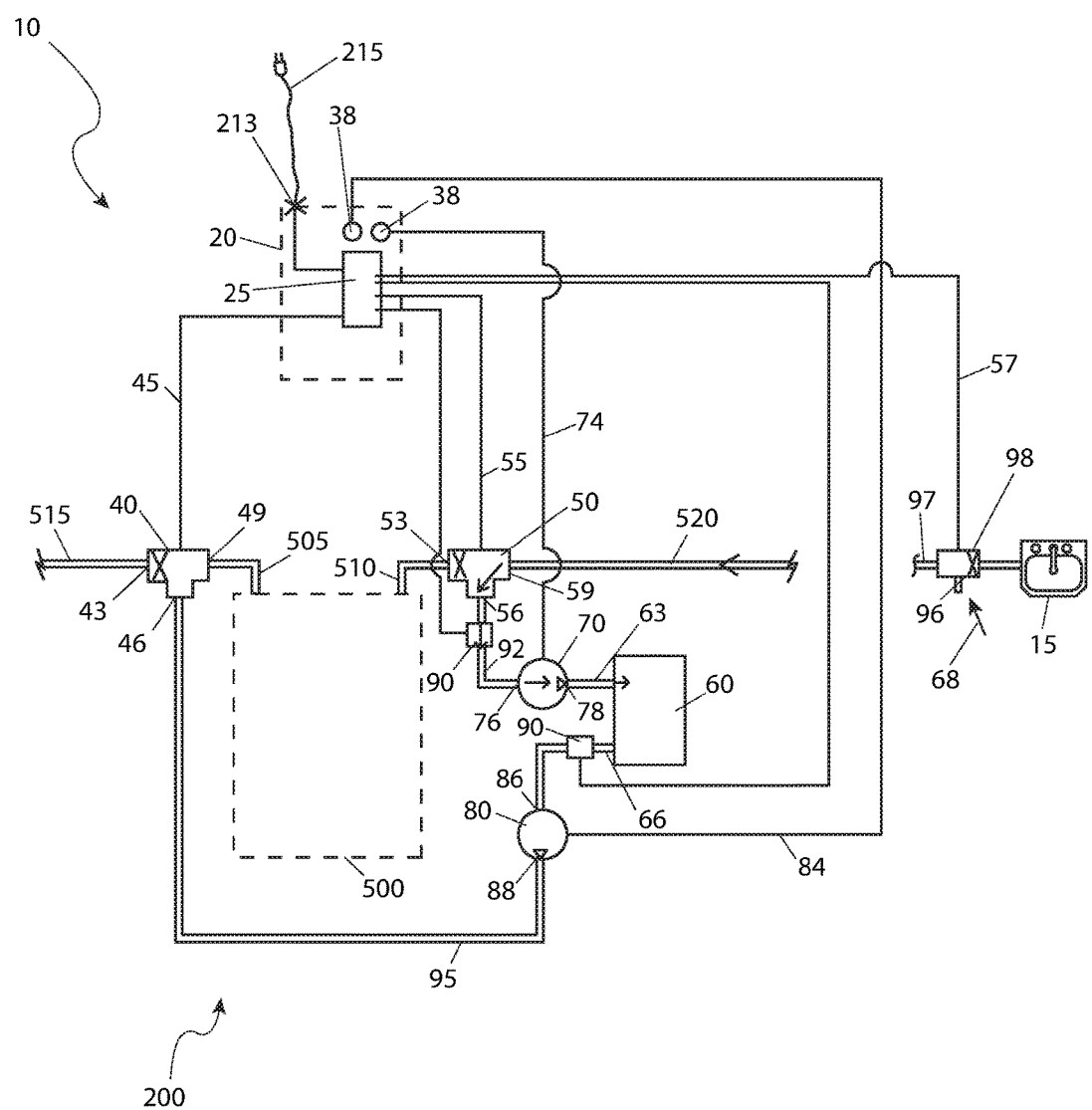
FIG. 2a is a diagram of the water system 10 of FIG. 1 showing an evacuation phase 200.
Figure 2B:
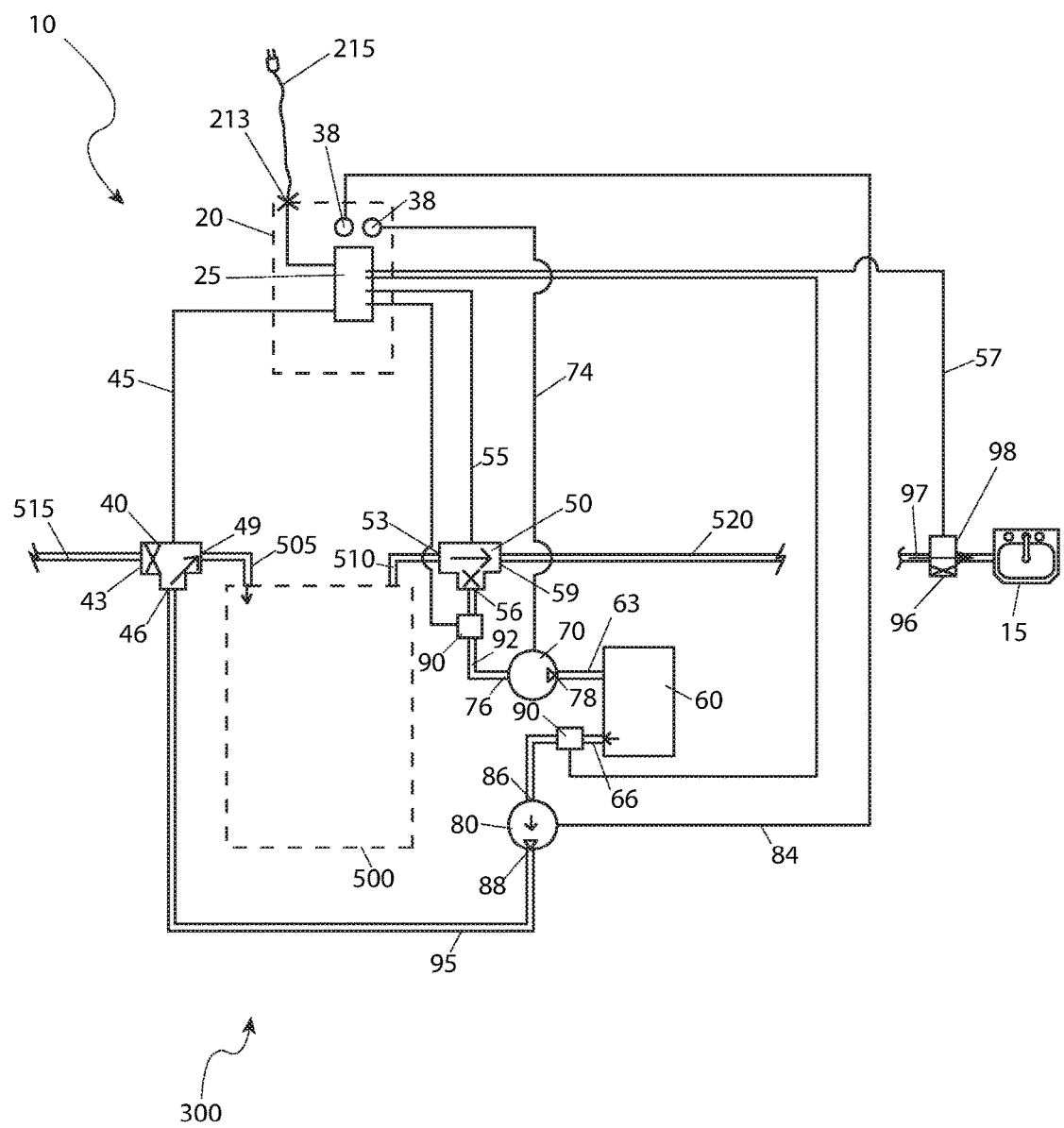
FIG. 2b is a diagram of the water system 10 of FIG. 1 showing a recycle phase 300; and, FIG. 2c is a diagram of the water system 10 showing a normal phase 100.
Figure 2C:
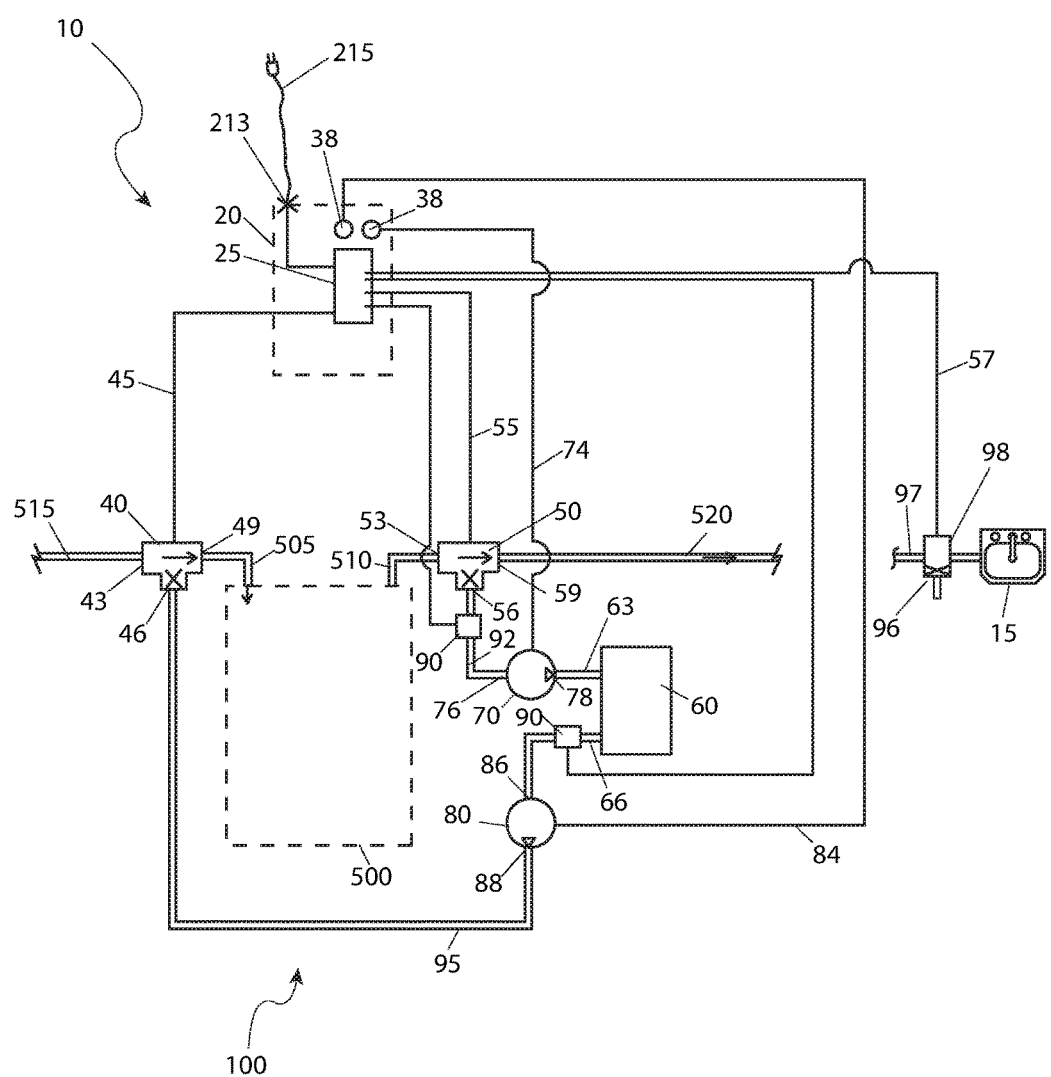

The preferred embodiment of the present invention is herein depicted within FIGS. 1 through 2c. However, the invention is not limited to the specifically described embodiment. A person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" as used herein do not denote a limitation of quantity, but rather denote the presence of at least one (1) of the referenced items.

Refer now to FIG. 1 for an isometric representation of a water system 10 that is in accord with the present invention. The present invention is a water diverter and recycle system (herein referred to as the "water system") 10 which makes hot water available at a plumbing fixture 15 without having to run water in a destination pipe 520 down a sink prior to hot water coming from the fixture 15. This saves both water and energy. Thus the problem being solved is reducing or eliminating wasted water and heat prior to water from the fixture 15 being delivered at the desired temperature. While the fixture 15 is depicted as a sink that is only for purposes of illustration and explanation. Other fixtures that use hot water such as a shower, tub, dishwasher, clothes washing machine, spigot, or the like will equally benefit from the present invention.

Removal of water from the destination pipe 520 is achieved by diverting water in the destination pipe 520 into a storage tank 60 during an evacuation phase 200. The diverted water is subsequently returned to a water heater 500 during a recycle phase 300. The destination pipe 520 is refilled with hot water from the water heater 500 which supplies the fixture 15 during a normal phase 100. After water is drained (diverted) water from the water heater 500 continues flowing through the destination pipe 520 and out the fixture 15 as long as the fixture 15 is open.

The water system 10 includes a first diverter valve 40 that is connected to a water heater inlet pipe 505 that feeds the hot water tank 500, a second diverter valve 50 that is connected to the water heater outlet pipe 510, a vacuum breaker valve 96, a pair of pumps 70, 80 that are used to circulate water, the temporary storage tank 60, and a programmable control module 20 containing the control logic to implement the operations of the water system 10. Control signals are supplied to the control module from flow sensors 90 distributed at key points in the water supply system 10.

The control module 20 houses a microprocessor 25 (see FIG. 2a) that receives input from a user by means of a keypad 30 and which executes a series of functions to bring about the phases 100, 200, 300 of the water system 10. The keypad 30 is configured to be a plurality of momentary contact switches, activated by touch, for inputting program parameters into the microprocessor 25. The keypad 30 is envisioned to minimally include push-button type switches for selectively setting the time at which at least the evacuation phase 200 occurs. It is further envisioned that the keypad 30 may comprise a complete keyboard encompassing push-button keys for an entire alphabet, Arabic numerals, and syntactic characters, either in a miniaturized format or as a plug-in.

Feedback of the functioning and programming of the control module 20 is provided on a display screen 35. The display screen 35 may be a single line or a multiple line LCD module capable of providing information and visualization of the parameters of the various phases 100, 200, and 300. It should be understood that other interactive readout devices, such as a touch screen monitor and a modified keypad 30 may be used. The control module 20 may be located as a stand-alone unit at any convenient location. The control module 20 may also reside as a logic program within a more complex processor. It is further envisioned that the control module 20 or any larger processor tasked with control of the water system 10 may be accessed remotely, such as via a wireless link to facilitate operation.

To implement the water system 10 modifications can be made to a standard water supply system to plumb the first diverter valve 40 into a water heater inlet pipe 505 and the second diverter valve 50 into a water heater outlet pipe 510 while also locating flow sensors 90 as shown in FIG. 1. The diverter valves 40, 50 are commercially available hydraulic flow control devices capable of configuring a flow path through a three-port (3-port) valve body by selectively enabling flow paths between a first port 43, 53 and a third port 49, 59; or between a second port 46, 56 and the third port 49, 59. Switching the paths is performed using internal electrically activated solenoids. Water flow may enter or exit any set of connected ports 43-46-49 and 53-56-59 under the control of the control module 20.

The flow sensors 90 are also commercially available flow sensors. The first diverter valve 40 has its first port 43 connected to a water inlet pipe 515; its third port 49 connected to the water heater inlet pipe 505; and its second port 46 connected to a recycle pipe 95. The second diverter valve 50 has its third port 59 in communication with a water heater outlet 510; its first port 53 connected to the destination pipe 520; and its second port 56 connected to a return pipe 92. The inlet pipe 515 receives water from the building water supply while the destination pipe 520 transfers water to the fixture 15. The diverter valves 40, 50 respectively are controlled by signals wire 45, 55 from the control module 20 and which respectively control the switching actions between the ports 43-46-49 and 53-56-59.

The vacuum breaker valve 96 is beneficially located at or near the fixture 15. The vacuum breaker valve 96 allows air to enter the destination pipe 520 which enables the water in the destination pipe 520 to drain out. Drainage can be accomplished either by gravity or by a vacuum pressure applied by the first pump 70 (as described in greater detail below). Water enters the vacuum breaker valve 96 at a vacuum valve input 97 side and exits to the fixture 15 at a vacuum valve output 98. Air selectively enters the vacuum breaker valve 96 through a vacuum valve air relief port 99. The vacuum breaker valve 96 is controlled by an internal solenoid, which in turn is controlled by electrical signals from the control module 20 via a signal wire 57.

The storage tank 60 is a generally cylindrical fluid pressure vessel capable of holding approximately five gallons (5 Gal) of water, which is sufficient to accept whatever volume of water is contained within the destination pipe 520. If the volume of water in the destination pipe 520 can exceed five gallon (5 Gal), a large storage tank 60 can be used. The storage tank 60 has an upper storage tank inlet 63 which is configured as a threaded, nominal one-half inch (½ in) tapered pipe fitting. The storage tank 60 also has a lower storage tank outlet 66 which is also configured to be a threaded one-half inch (½ in) tapered pipefitting. It is understood that other pipe sizes and configurations may be utilized without limiting the scope of the water system 10.

The first pump 70 is connected in-line between a return pipe 92 and the storage tank inlet 63 with the return pipe 92 being connected to a first pump inlet 76 and the storage tank inlet 63 being connected to the first pump outlet 78. This first pump 70 selectively drains water resident in the destination pipe 520 through the second diverter valve 50 to the storage tank 60. That occurs when a first pump power supply line 74 is energized and applied to the first pump 70. A first flow sensor 90 is located at the input to the first pump 70. The first flow sensor 90 senses when the draining of the water is complete. The first pump power supply line 74 receives power that is routed through a relay switch 38 located in the control module 20 and which is activated by the microprocessor 25. The first pump 70 is beneficially an impeller-type pump capable of a sufficient flow rate to drain water from the destination pipe 520 in a reasonable length of time. It is understood that other types of pumps, such as vane-type or the like, may be utilized without limiting the scope of the water system 10.

The second pump 80 is connected in-line between the storage tank outlet 66 and the recycle pipe 95. The storage tank outlet 66 connects to a second pump inlet 86 while the recycle pipe 95 connects to a second pump outlet 88. A second flow sensor 90 is located at the output of the storage tank. The second flow sensor 90 senses when the storage tank is empty as shown by flow stopping. The second pump 80 transfers water from the storage tank 60 back to the water heater 500 through the first diverter valve 40 when the second pump 80 receives operating voltage from a second pump power supply line 84. The second pump power supply line 84 is routed through another relay switch of the relay 38 under the control of the control module 20. The second pump 80 may be of a similar style to the first pump 70.

Refer now to FIG. 2a for a diagram of the water system 10 in an evacuation phase 200. The first step is replacing water in the destination pipe 520 which may have cooled with hot water right out of the hot water tank 500. To do so the destination pipe 520 is purged under the direction of the control module 20. The control module 20 may be programmed to purge the destination pipe 520 just prior to hot water coming from the fixture 15 or on demand. Either way the microprocessor 25 activates the first diverter valve 40 via the first valve signal wire 45 to close the first valve 40 first port 43, thereby disabling the flow of water from the inlet pipe 515 through the first valve 40 and into the hot water heater 500. Closing the first port 43 also opens the second port 46 to establish water flow between the second port 46 and the third port 49. Simultaneously, the second diverter valve 50 is actuated via the second valve signal wire 55 to close the second valve 50 first port 53 to block water flow from the water heater 500. Closing the first port 53 also causes a concurrent opening of the second valve 50 second port 56 so that water can flow through the second valve 50 from the third port 59 to the second port 59. The microprocessor 25 also activates the vacuum breaker valve 96 to allow air 68 to enter the destination pipe 520 from near the fixture 15. The first pump 70 is activated via the first pump power supply line 74 to enable water to drain from the destination pipe 520 through the return pipe 92, through the second valve 50, through the first pump 70, and into the storage tank 60 via the storage inlet 63. Water flow continues until a flow sensor 90 in the return pipe 92 signals the microprocessor 25 that water flow in the return pipe 92 has ceased, indicating that the destination pipe 520 is empty. The microprocessor 25 then interrupts the first pump power supply line 74 to stop the first pump 70 while also closing the vacuum breaker valve 96. The destination pipe 520 has thus been drained and water system 10 operations can proceed to the recycle phase 300.

FIG. 2b helps explain the recycle phase 300. After the evacuation phase 200 is complete the microprocessor 25 signals the second diverter valve 50, which was previously closed, to open the second valve first port 53. The first port 53 opens while the second port 56 closes. This enables water to flow from the water heater 500 into the water heater outlet pipe 510, through the second valve 50, into the destination pipe 520, past the now closed vacuum breaker valve 96 and into and then from the fixture 15. The first diverter valve 40 is configured to have its first port 43 closed to the inlet pipe 515 and its second port 46 open to the recycle pipe 95. Having sensed the response of the second diverter valve 50 through a feedback signal from a sensor 90 the microprocessor 25 activates the second pump 80 via the second pump power supply line 84 which is routed through the relay switch 38. The second pump 80 causes water flow from the storage tank outlet 66, through the second pump 80, through the recycle pipe 95, through the first valve 40 via the first valve second port 46, from the third port 49 and into the water heater 500 via the water heater inlet pipe 505. The water that was drained from the destination pipe 520 is then heated (actually re-heated) in the water heater 500 while displacing heated water from the water heater 500 which flows through the water heater outlet pipe 510, through the first port 53 which has been opened by the microprocessor 25, through the second valve 50, out the third port 59 to the destination pipe 520. The recycle phase 300 continues until a flow sensor 90 in the storage tank outlet 66 indicates that the temporary storage tank 60 is empty. The microprocessor 25 then interrupts the second power supply line 84 to stop the second pump 80. The microprocessor 25 then sets the water system 10 to a normal phase 100 as illustrated in FIG. 2c.

Referring now to FIG. 2c, in the normal phase 100 the first valve first port 43 opens to enable water flow from the inlet pipe 515 through the first valve 40 and out its third port 49 while the second port 46 is closed. Water from the third port 49 flows through the water heater inlet pipe 505 into the water heater 500 where it is heated. With the fixture 15 open heated water exits the water heater 500 through the water heater outlet pipe 510, through the first port 53 of the second valve 50, out its third port 59, through the destination pipe 520, past the closed vacuum breaker valve 96 and into and then out of the fixture 15.

The preferred embodiment of the invention can be utilized by an individual in a simple and straightforward manner with little or no training. After initial purchase or acquisition of water system 10 that components that are not already parts of an existing water system would be installed as indicated in FIG. 1. The method of installing and utilizing the device 10 may be achieved by: acquiring the appropriate components necessary to properly accomplish the intended task of the water system 10; correctly installing those components, preferably a qualified provider of such services; programming the control module 20 using the keypad 30 and display screen 35 to implement the evacuation phase 200, the recycle phase 300, and the normal phase 100; energizing the water system 10 from input AC power from a power line 215, enjoying a hot bath or shower or other service while saving water and energy. That water system 10 is also well suited to be part of new construction or implemented while remodeling or retrofitting.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A water supply system, comprising: a destination line for supplying water to a fixture; an electronically controlled vacuum valve connected to a fixture end of said destination line, said vacuum valve having an air inlet that selectively allows air to enter said destination line; an electronically controlled hot water valve having a hot water input port, a drain port, and a hot water output port connected to said destination line, said hot water valve for selectively enabling water to drain from said hot water output port and out said hot water drain port; a storage tank having a storage tank input and a storage tank output; a drain connection disposed between said storage tank input and said hot water drain port; a controller operatively connected to said vacuum valve and to said hot water valve, said controller for selectively opening said air inlet while enabling water to drain from said destination line into said storage tank, said drain connection includes a drain pump for assisting draining and operatively controlled by said controller; a power input line; and a relay for selectively switching power applied by said power input line to said drain pump, wherein said relay is controlled by said controller, a first sensor sending said controller a first signal that indicates when water has stopped draining; a second sensor sending said controller a second signal that indicates when said storage tank is empty; wherein a water heater includes a water heater inlet port, further comprising: an electronically controlled water tank inlet valve operatively connected to said controller and having a water inlet port, a water outlet port, and a storage tank inlet port, a water heater inlet pipe for transferring water from said water outlet port into said water heater inlet port; a storage tank connection connecting said storage tank outlet port to said water inlet port, wherein said controller selectively causes said water tank inlet valve to enable water to flow from said storage tank connection into said water heater inlet pipe; said water heater having a water heater outlet port; and a hot water outlet pipe connecting said water heater outlet port to said hot water input port, wherein said controller controls said hot water valve to prevent hot water from flowing through said hot water outlet pipe when water drains into said storage tank; wherein said controller includes a microcontroller that operates in accord with a non-transitory storage media; wherein said controller controls said hot water valve to enable water to flow through said hot water outlet pipe and into said destination line when water is not draining into said storage tank; wherein said storage tank connection includes a connection pump that is operatively connected to said controller, wherein said controller controls said connection pump to selectively pump water from said storage tank into said water heater.

2. The water supply system according to claim 1, further comprising a water inlet pipe connected to said water inlet port, wherein said controller controls said water tank inlet valve to enable water to flow from said water inlet port into said water heater when water is not flowing from said storage tank connection into said water heater inlet pipe.

3. The water supply system according to claim 2, further comprising a fixture connected to said vacuum valve.

4. The water supply system according to claim 1, further comprising.

5. The water supply system according to claim 4, further comprising.

\* \* \* \* \*